(12) United States Patent
Conner et al.

(10) Patent No.: US 7,292,134 B2
(45) Date of Patent: Nov. 6, 2007

(54) SELECTABLE RANGE REMOTE ENTRY SYSTEM

(75) Inventors: Bruce Conner, Ann Arbor, MI (US); Qingfeng Tang, Novi, MI (US); John Nantz, Brighton, MI (US); Ronald O. King, Brownstown, MI (US); Art Turovsky, Southfield, MI (US); Matthew Honkanen, Royal Oak, MI (US); Zoran Kovac, Macomb Township, MI (US)

(73) Assignee: Lear Corporation, Southfield, MI (US)

( * ) Notice: Subject to any disclaimer, the term of this patent is extended or adjusted under 35 U.S.C. 154(b) by 347 days.

(21) Appl. No.: 10/979,441

(22) Filed: Nov. 1, 2004

(65) Prior Publication Data

US 2006/0091997 A1    May 4, 2006

(51) Int. Cl.
    *H04Q 9/00*    (2006.01)
(52) U.S. Cl. .................................. 340/5.64; 340/5.72
(58) Field of Classification Search ............... 340/5.64, 340/5.72
    See application file for complete search history.

(56) References Cited

U.S. PATENT DOCUMENTS

| | | | |
|---|---|---|---|
| 5,541,585 A * | 7/1996 | Duhame et al. ........... 340/5.62 |
| 5,600,323 A | 2/1997 | Boschini | |
| 6,034,617 A * | 3/2000 | Luebke et al. ............. 340/5.62 |
| 6,236,333 B1 * | 5/2001 | King ......................... 340/5.61 |
| 6,552,649 B1 * | 4/2003 | Okada et al. ............. 340/5.61 |
| 6,583,715 B1 | 6/2003 | Benzie et al. | |
| 6,658,328 B1 | 12/2003 | Alrabady et al. | |
| 2001/0038328 A1 | 11/2001 | King et al. | |
| 2004/0037365 A1 | 2/2004 | King et al. | |

FOREIGN PATENT DOCUMENTS

| | | |
|---|---|---|
| EP | 1217588 A2 | 6/2002 |
| EP | 1466789 A1 | 10/2004 |

* cited by examiner

*Primary Examiner*—Jeffery Hofsass
*Assistant Examiner*—Scott Au
(74) *Attorney, Agent, or Firm*—MacMillan, Sobanski & Todd, LLC

(57) ABSTRACT

A vehicle remote entry system is provided which includes a keyless entry module for controlling the actuation of at least one vehicle entry function. A remote entry device for transmitting a wireless signal to the remote keyless entry module for activating the at least one vehicle entry function. A human machine interface for selecting at least one vehicle operating parameter including a signal range limitation setting for defining an operating range of the wireless signal for actuating the at least one vehicle entry function. The human machine interface provides the signal range limitation setting to the remote keyless entry module and a controller determines whether the wireless vehicle entry signal is within the signal range limitation setting for allowing actuation of the at least one vehicle entry function.

14 Claims, 3 Drawing Sheets

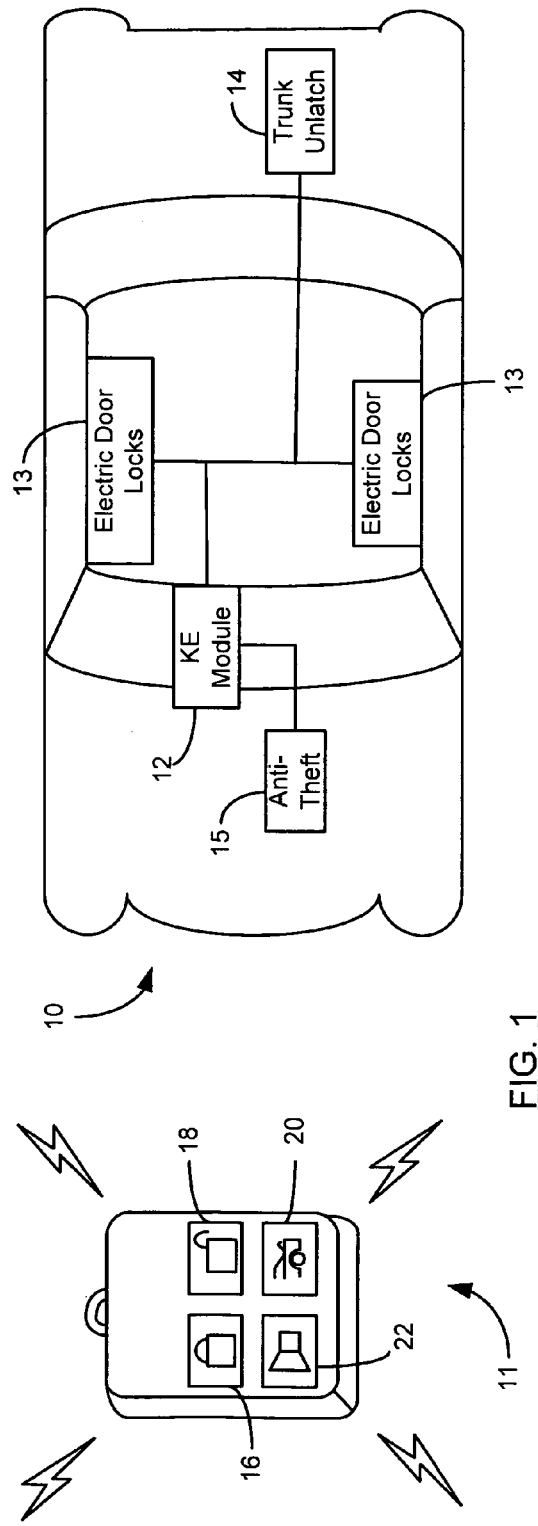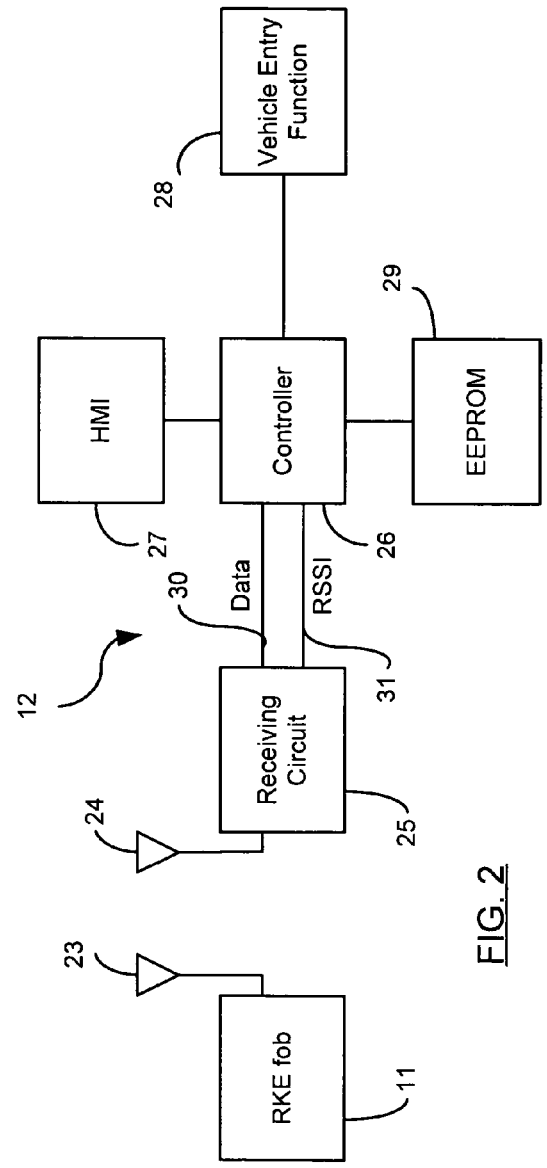
FIG. 1
FIG. 2

SELECTABLE RANGE REMOTE ENTRY SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to remote keyless entry, and more specifically, to selecting a maximum operating distance from which the remote keyless entry device may be actuated a vehicle entry function.

2. Description of the Related Art

Remote vehicle entry transmitters are used for performing a wireless operation on a vehicle such as locking and unlocking a door, unlatching a trunk latch, or activating or deactivating an alarm system equipped on the vehicle. These remote entry devices are commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle.

Typically, when the operator of the vehicle is leaving the vicinity of the vehicle, the operator depresses one of the buttons relating to a vehicle entry function, such as the lock door function, for safely securing the vehicle while left unattended. After successfully completing the vehicle lock function via the wireless transmission, the operator then places the fob into a clothing pocket or other personal storage accessory (e.g., purse). Once stored in the clothing pocket or in the personal storage accessory, a button may be accidentally depressed while within the predetermined reception range of the vehicle thereby actuating one of the vehicle entry functions. This may be unwanted by the operator if the button depressed is either the door unlock, panic alarm, or the trunk unlatch. Since different vehicles have different vehicle RKE systems, the RKE reception range for a respective remote entry may vary.

While some operators of vehicles may find it personally suitable to have a large reception range for RKE actuation, others may find it suitable to have a small reception range to deter actions such as accidental RKE function actuation when within an RKE operating range of the vehicle. Alternatively, some vehicle operators may desire to have a first RKE function (e.g., door lock) with a large reception range, while a second RKE function (e.g., door unlock) with a small reception range. What would be desirable is for an operator to selectively choose the reception range for a RKE system or various functions of the RKE systems.

SUMMARY OF THE INVENTION

The present invention has the advantage of allowing an operator of a vehicle to select a receiving range between a remote entry device and an RKE module for actuating vehicle entry functions.

A vehicle remote entry system is provided which includes a keyless entry module for controlling the actuation of at least one vehicle entry function. A remote entry device for transmitting a wireless signal to the remote keyless entry module for activating the at least one vehicle entry function. A human machine interface for selecting at least one vehicle operating parameter including a signal range limitation setting for defining an operating range of the wireless signal for actuating the at least one vehicle entry function. The human machine interface provides the signal range limitation setting to the remote keyless entry module and a controller determines whether the wireless vehicle entry signal is within the signal range limitation setting for allowing actuation of the at least one vehicle entry function.

BRIEF DESCRIPTION OF THE DRAWINGS

FIG. 1 is a perspective view of a vehicular remote keyless entry system according to an embodiment of the present invention.

FIG. 2 is a block diagram of a vehicular remote keyless entry system according to an embodiment of the present invention.

DETAILED DESCRIPTION OF PREFERRED EMBODIMENTS

Figure 3:
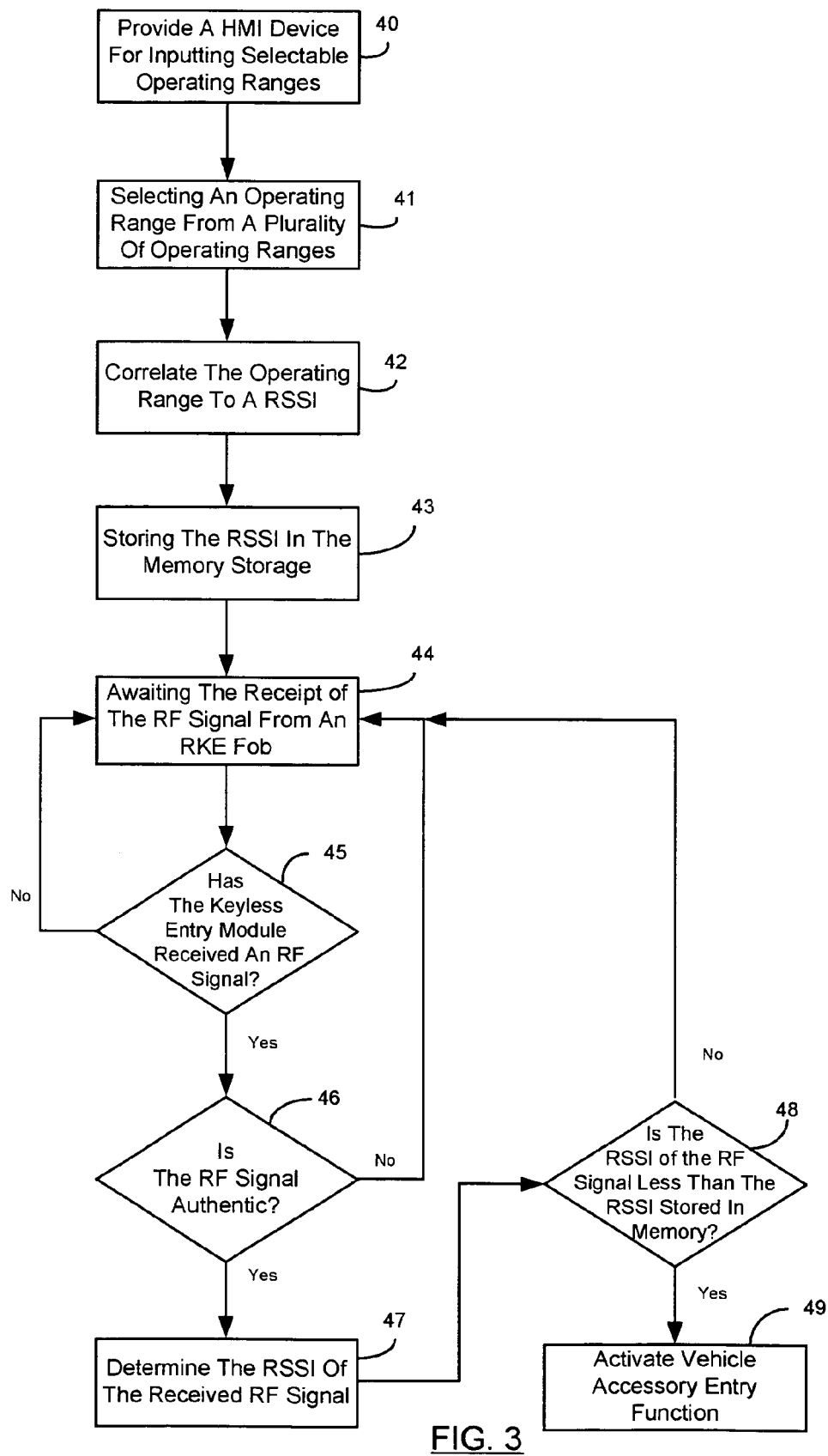
FIG. 3 is a flowchart for actuating a vehicle entry function based on the range of a transmitted wireless signal according to a first embodiment of the present invention.

FIG. 1 shows a remote vehicle interface device such as a remote keyless entry (RKE) fob 11 for broadcasting RF signals to a keyless entry module 12 located within a vehicle 10 for actuating vehicle entry functions such as unlocking and locking a vehicle door 13, unlatching a trunk latch 14, and for activating and deactivating a vehicle alarm system 15. A vehicle lock switch 16 and a vehicle unlock switch 18 are commonly disposed on a face of the RKE fob 11. The RKE fob 11 may further include a trunk unlatch switch 20 and alarm switch 22 for activating and deactivating a vehicle alarm. The RKE fob 11 typically broadcasts the RF signals at a maximum power level that is regulated by the FCC. Based on the sensitivity of the receiver, the keyless entry module 12 receives the RF signal when the vehicle 10 (i.e., keyless entry module 12) is within the broadcasting range of the RKE fob 11. The keyless entry module 12 determines the validity of the RF signal broadcast by the RKE fob 11 for actuating vehicle entry functions.

FIG. 2 illustrates a block diagram of an RKE system having a selectable operating range between an RKE fob and a keyless entry module for actuating the vehicle entry function. The keyless entry module 12 is shown to include a receiving circuit 25 and a controller 26 for receiving and processing RF signals from the RKE fob 11 for actuating a vehicle entry function. The RKE fob 11 transmits the RF signal via antenna 23. A receiving circuit 25 receives the RF signal via antenna 24 and transmits a request signal to the controller 26 by way of a data signal line 30. The controller 26 processes the request signal to determine the authenticity of the RF signal. If the controller determines that the RF signal is authentic, the controller 26 generates a control signal over a communication bus 30 for actuating a respective vehicle accessory.

To selectively control a receiving range of a respective RKE system, an operator of a vehicle utilizes a human machine interface 27 to select the maximum allowable distance between the RKE fob 11 and the keyless entry module 12 for remotely requesting actuation of a vehicle entry function. The HMI 27 may include a display information center or similar interface for selecting the desired operating range. The HMI 27 includes an LCD display which provides menu driven screens for selectively customizing various vehicle operating features. The HMI 27 includes a menu driven option which provides a selection of a plurality receiving operating ranges for which the keyless entry module 12 will authorize access from. For example, a first selection range may be 0-15 meters, a second range may be 0-30 meters, a third operating distance may be 0-45 meters, a fourth range may be 0-60 meters, and a fifth range may be 0-150 meters. After the operator selects a desired operating range, the selection is transmitted to the RKE module 12 via the communication bus 30. This selection is stored in the memory of the controller 26 in the form of a byte. In the preferred embodiment, to avoid utilizing memory of the controller 26, an EEPROM 29 (electronic erasable programmable read only memory) is used to store the selection. In alternative embodiments, if sufficient memory is available in the controller 26, the data associated with the selection may be stored in the memory of the controller 26.

When the RF signal is transmitted within the receiving range of the keyless entry module, the RF signal is received via antenna 24 by the receiving circuit 25 of the keyless entry module 12. The receiving circuit 25 determines a received signal strength indicator signal strength of the RF signal when received by the receiving circuit 25. The signal strength is proportional to the power of the RF signal received by the receiving circuit 25. The signal strength or received signal strength indicator (RSSI) signal is transmitted to an analog to digital (A/D) input of the controller 26 by way of a RSSI signal line 31. The controller 26 then measures the signal strength of the received RF signal and correlates the signal strength to a signal transmission distance between the RKE fob 11 and the keyless entry module 12. The controller 26 compares the distance determined from the signal strength with the selected operating range stored in the memory of the EEPROM 29. If the distance as determined from the signal strength is within the operating range of the selected operating range, then the controller 26 provides a control signal via the communication bus 30 to a vehicle accessory 29 for activating the vehicle entry function associated with the transmitted RF signal. If the distance is beyond the selected operating range, then no further action is taken by the controller 26.

Alternatively, to reduce processing time of having to correlate the signal strength to a distance each time a RF signal is received by the receiving circuit 25, an operating range when selected via the HMI 27 is correlated to a respective signal strength and stored in memory of the controller 26 or the EEPROM 29. Having the selected operating range stored in memory as signal strength data allows the controller 26 to directly compare the stored signal strength selected through the HMI 27 with the signal strength of the received RF signal. This eliminates the processing operation of the controller 26 having to correlate the signal strength of a RF signal to a distance each time a respective RF signal is received from the transmitting RKE fob 11. This reduces the processing time of determining whether the received RF signal is within the selected operating range since only a comparison of the respective signal strengths is required after the initial selected operating range has been correlated to a respective signal strength. The selected operating range will require further correlating only if a new operating range is selected.

In another preferred embodiment, two bytes of information may be used for storing the selected operating range chosen by the operator. Designating two bytes of memory for storing data associated with the selected operating range allows the operator to select an operating range between 0 and 256 meters (assuming that 0 is not chosen as a maximum distance). The HMI 27 may either allow the distance to be entered in via a numeric keypad or a scrolling display may be utilized to increment or decrement selection buttons.

In yet another preferred embodiment, each vehicle entry function (e.g., door lock, door unlock, trunk unlock, panic alarm) may be individually programmed for selecting a respective operating range for a respective vehicle entry function. For example, when an operator of a vehicle is away from the vehicle, the operator typically prefers the vehicle to be securely locked. There would be no nuisance to the operator if the vehicle lock button was accidentally actuated a great distance from the vehicle since the vehicle is already in a vehicle lock condition. Furthermore, an operator unsure of whether the door lock feature was activated after departing the vehicle would prefer to have a long door lock function operating range so that the vehicle door lock may be actuated at a large distance as opposed to walking back to the vehicle and actuating the door lock function within the shorter range.

Moreover, an operator would typically prefer to unlock the vehicle only at close ranges. As discussed earlier, an operator usually locks the vehicle immediately after departing the vehicle and then places the RKE fob into a clothing pocket or other personal storage accessory. By setting the door unlock function at a short range, the operator can thereafter place the RKE fob into storage without accidentally activating the vehicle unlock function. Furthermore, an operator typically prefers to have a short operating range set for the unlock function as an operator may desire to have the vehicle in sight before unlocking the vehicle due to intruders being near or at the vehicle. In this embodiment, one or two bytes of information would be stored for a respective entry function such as door unlock, door lock, trunk unlatch, and panic alarm. The RKE module would demodulate and authenticate which vehicle entry function has been requested for actuation and then retrieve from memory the associated operating range selected for the respective vehicle entry function.

FIG. 3 illustrates a preferred method for actuating a vehicle entry function based on the range of a transmitted wireless signal according to an embodiment of the present invention. In step 40, an HMI is provided within a vehicle for selecting vehicle operating functions personal to the operator. The HMI may be an LCD display system with an option menu or other similar device. In step 41, an operating range is chosen for selecting the maximum distance that an RF signal broadcast from an RKE fob may be received by a keyless entry module for actuating a vehicle entry function. In step 42, the selected operating range is correlated to a signal strength (i.e., RSSI). The RSSI is indicative of the power of the RF signal received by the keyless entry module. In step 43, the selected operating range is stored in the memory of the controller or similar memory device (EEPROM). The stored RSSI will be recalled for later comparison with the received RF signal for determining whether the received RF signal is with the selected operating range selected by the operator.

In step 44, a receiving circuit awaits a RF signal broadcast from a RKE fob. In step 45, a determination is made whether a RF signal has been received. If a RF signal has not been received, then a return is made to step 44 to await a broadcast RF signal. If a determination was made in step 45 that a RF signal is received, then a determination is made in step 46 regarding the authenticity of the RF signal intended for vehicle entry activation. If a determination is made that the RF signal is not authentic, then a return is made to step 44 to await a next RF signal. If a determination is made in step 46 that the RF signal is authentic, then the RSSI of the received RF signal is made in step 47. In step 48, the RSSI of the received RF signal is compared to the RSSI stored in memory for the intended vehicle entry function actuated. A determination is made whether the RSSI of the received RF signal is equal to or less than the RSSI stored in memory. If the RSSI of the received signal is greater than the RSSI stored in memory, then the vehicle entry function selected is not actuated and a return is made to step 44 to await receipt of a next RF signal from the RKE fob. If the determination was made in step 48 that the RSSI of the RF signal is less than or equal to the RSSI stored in memory, then the vehicle entry function selected is actuated.

Figure 4:
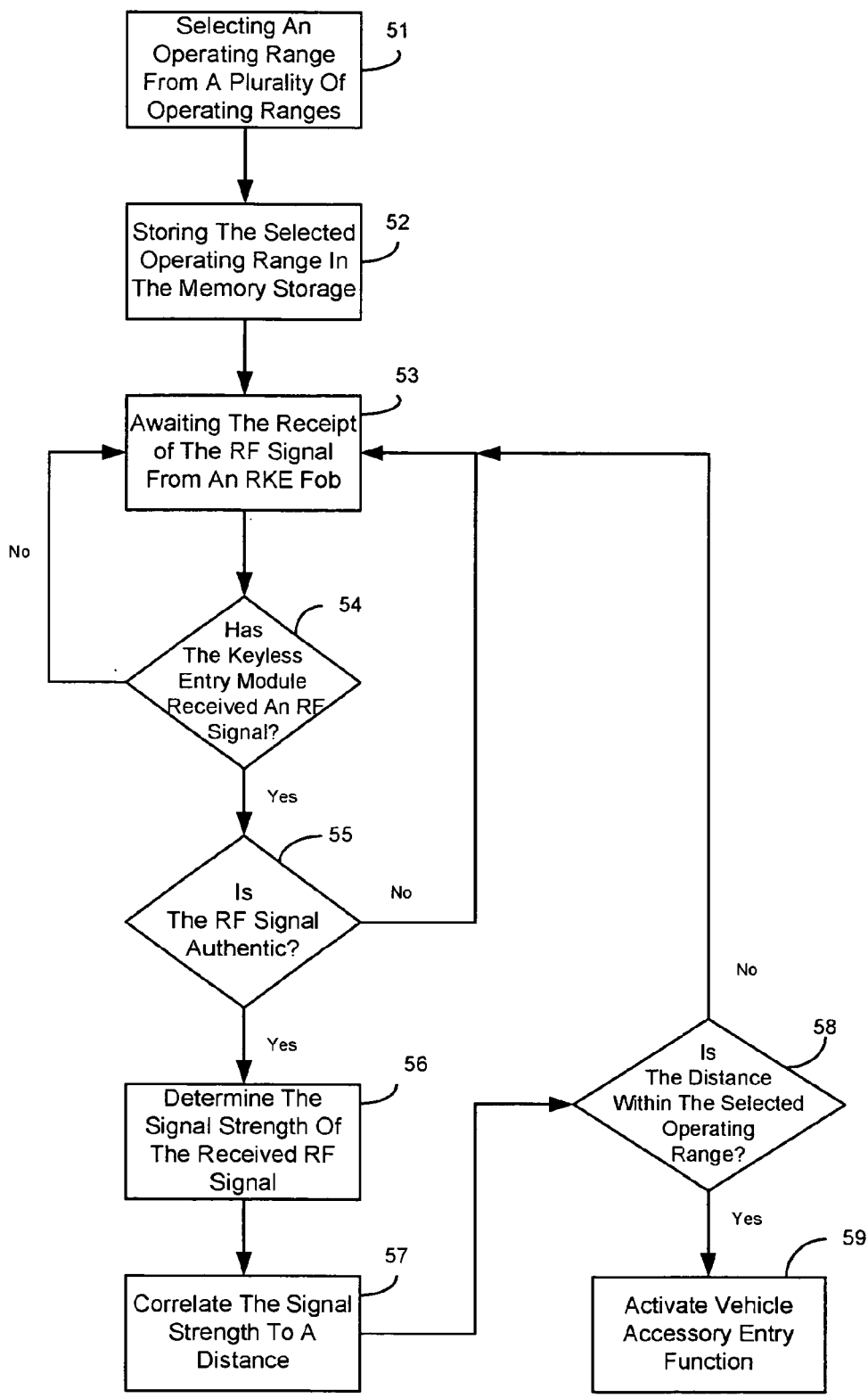
FIG. 4 is a flowchart for actuating a vehicle entry function based on the range of a transmitted wireless signal according to a second embodiment of the present invention.

FIG. 4 illustrates another preferred embodiment for actuating a vehicle entry function based on the range of a transmitted wireless signal according to an embodiment of the present invention. In step 51, an operating range is selected through an HMI for setting a maximum limit on the distance that a RKE fob may be located from a keyless entry module for allowing the actuation of the requested vehicle entry function. The chosen operating range is selected from a plurality of predetermined operating ranges. In step 52, the selected operating range is stored in the memory of a controller or other similar based memory device. The selected operating range may be stored in at least one byte of memory.

In step 53, a receiving circuit awaits a RF signal broadcast from a RKE fob. In step 54, a determination is made whether an RF signal has been received. If an RF signal has not been received, then a return is made to step 53 to await the broadcast RF signal. If a determination was made in step 54 that a RF signal is received, then a determination is made in step 55 regarding the authenticity of the RF signal intended for vehicle entry actuation. If a determination is made that the RF signal is not authentic, then a return is made to step 53 to await a next RF signal. If a determination is made in step 55 that the RF signal is authentic, then the signal strength of the received RF signal is made in step 56. The signal strength of the RF signal is proportional to the power of the RF signal received by the keyless entry module.

In step 57, the signal strength of the received RF signal is correlated to a distance. The distance represents the transmitted distance of the RF signal between RKE fob and the keyless entry module. In step 58, the selected operating range is retrieved from memory of the controller or like device and is compared with the distance as determined by the signal strength of the RF signal. If a determination is made that the distance is not within the selected operating range, then a return is made to step 53 to await a next RF signal. If the determination is made in step 58 that the distance is within the selected operating range, then the controller transmits a signal in step 59 via a communication bus to the respective vehicle accessory for which the vehicle entry function is requested for activating the respective vehicle accessory.

From the foregoing description, one ordinarily skilled in the art can easily ascertain the essential characteristics of this invention and, without departing from the spirit and scope thereof, can make various changes and modifications to the invention to adapt it to various usages and conditions. For example, various other vehicle entry functions in addition to various length operating ranges may be utilized.

What is claimed is:

1. A vehicle remote entry system comprising:
   a keyless entry module including a controller for controlling the actuation of at least one vehicle entry function;
   a remote entry device for transmitting a wireless signal to said keyless entry module for activating said at least one vehicle entry function;
   a human machine interface for selecting at least one vehicle operating parameter including a signal range limitation setting for defining an operating range of said wireless signal for actuating said at least one vehicle entry function;
   wherein said human machine interface provides said signal range limitation setting to said remote keyless entry module, and wherein said controller determines whether said wireless vehicle entry signal is within said signal range limitation setting for allowing actuation of said at least one vehicle entry function.

2. The remote entry system of claim 1 wherein said signal range limitation setting includes a plurality of selectable operating ranges.

3. The remote entry system of claim 1 wherein said remote entry device includes a key fob.

4. The remote entry system of claim 1 wherein said keyless entry module includes a receiving circuit for determining a distance of said remote entry device to said keyless entry module in response to said transmitted wireless signal.

5. The remote entry system of claim 4 wherein said receiving circuit measures a received signal strength for determining said distance.

6. The remote entry system of claim 1 wherein said at least one vehicle entry function includes a door unlock function.

7. The remote entry system of claim 1 wherein said at least one vehicle entry function includes a door lock function.

8. The remote entry system of claim 1 wherein said at least one vehicle entry function includes a trunk unlatch function.

9. The remote entry system of claim 1 wherein said at least one vehicle entry function includes a vehicle anti-theft device.

10. A method for selectively actuating a vehicle entry function based on the range of a transmitted wireless signal between a remote entry device and a vehicle based keyless entry module, the method comprising the steps of:
    selecting a signal range limitation selling from a plurality of operating ranges;
    storing said selected range limitation setting in a memory of said keyless entry module;
    receiving said wireless signal from said remote entry device;
    determining a transmitted distance of said transmitted wireless signal between said remote entry device and said keyless entry module;

comparing said distance of said wireless signal to said signal range limitation setting stored in said memory;

determining if said distance of said transmitted wireless signal is within said signal range limitation setting; and actuating a vehicle entry function in response to said wireless signal being within said signal range limitation setting.

11. The method of claim 10 wherein said step of determining said distance includes determining a received signal strength indicator.

12. The method of claim 11 wherein said received signal strength indicator is proportional to a power of the wireless transmitted signal.

13. The method of claim 10 wherein at least one signal range limitation setting provides an operating range for a plurality of vehicle entry functions.

14. The method of claim 10 wherein a plurality of signal range limitation settings provides an operating range for a plurality of vehicle entry functions, respectively.

* * * * *